H. PRACK.
TROLLEY WHEEL.
APPLICATION FILED AUG. 7, 1911.
1,033,345.
Patented July 23, 1912.
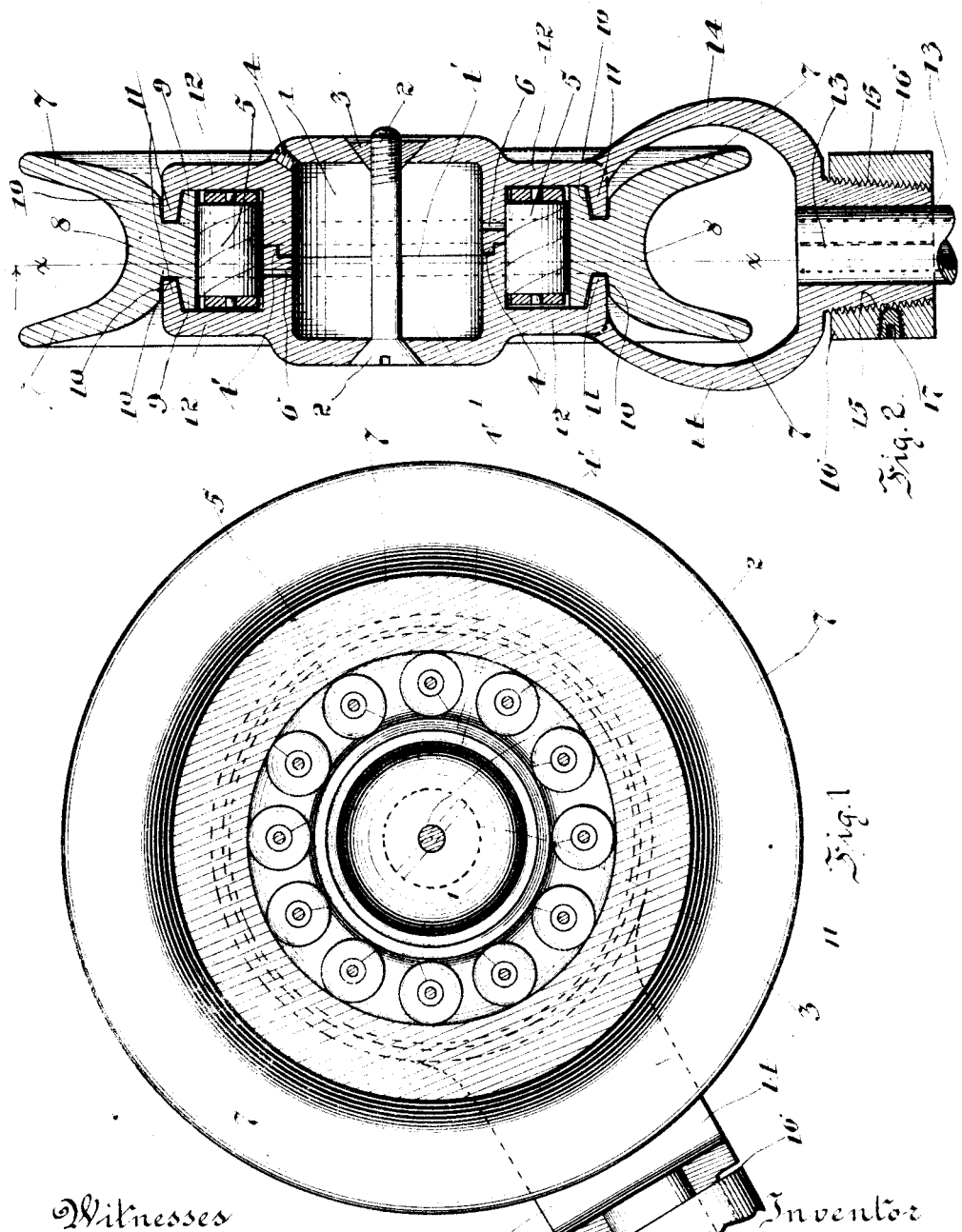
Witnesses
W. F. Smith
B. G. Richards
Inventor
Henry Prack,
by Joshua R. H. Potts
his Attorney

UNITED STATES PATENT OFFICE.

HENRY PRACK, OF OTTAWA, ILLINOIS.

TROLLEY-WHEEL.

1,033,345.  Specification of Letters Patent.  Patented July 23, 1912.

Application filed August 7, 1911. Serial No. 642,701.

*To all whom it may concern:*

Be it known that I, HENRY PRACK, a citizen of the United States, and a resident of the city of Ottawa, county of Lasalle, and State of Illinois, have invented certain new and useful Improvements in Trolley-Wheels, of which the following is a specification.

My invention relates to improvements in trolley wheels, the trolley wheel herein shown and described being designed as an improvement over the trolley wheel forming the subject matter of my application filed July 3rd, 1911. Serial No. 636,607.

The invention consists in the combinations and arrangements of parts hereinafter described and claimed.

My invention will be best understood by reference to the accompanying drawing forming a part of this specification, and in which, Figure 1 is a sectional elevation of a trolley wheel embodying my invention, and Fig. 2 is a central transverse section, the sectional parts shown in Fig. 1 being taken on line $x$—$x$ of Fig. 2.

The preferred form of construction as illustrated in the drawing comprises an axle which consists of two similar circular members 1 which are rigidly secured together by means of an axially disposed countersunk head bolt 2 having a counter-sunk nut 3. The joint 4' between the members 1 is stepped and disposed transversely of the axis of bolt 2, the latter being designed to draw the contiguous surfaces of said joint into close contact. The formation of the axle is such that when the two parts thereof are secured together that a cylindrical chamber is formed in the interior thereof as shown in Fig. 2. This chamber is designed to be filled with a lubricant, such as a grease or semi-fluid oil which is introduced thereto and retained therein by means of a filler plug 4 which is inserted in the wall of the axle at any suitable point. The periphery of the axle is cylindrical in form and is traversed by a roller bearing 5, the rollers of which are flexible and spirally formed as is generally known by those skilled in the art. In order to lubricate the roller bearing 5 a series of apertures 6 is arranged in the peripheral wall of the axle for establishing a communication between the lubricant chamber and the peripheral surface of the axle. By this construction the grease or oil contained in said chamber oozes out automatically to lubricate the contacting surfaces of the bearing 5. Should the bearing 5 become heated due to its revolving at a high speed a greater amount of oil will ooze through the apertures 6 to automatically compensate for the added friction due to the heating of a bearing.

A metallic ring 7 is mounted for rotation upon the bearing 5 and is provided with a peripheral groove 8 for traversing the electrical feed or conductor wire. The internal surface of the ring 7 is formed cylindrically and is of a diameter corresponding with the diameter of the circular path of the periphery of the bearing 5. Extending laterally from each side of the ring 7 is a flange 9 the interior surface of which forms a part of the cylindrical interior surface of the ring which bears upon the bearing 5. Annular recesses 10 are thus formed in the sides of the ring 7 which are designed to receive inwardly extending flanges 11 provided at the periphery of radially extending flanges 12 embracing the bearing 5 and formed integral with the members 1. The object of this construction is to preclude the possibility of foreign matter such as dust and dirt from entering the bearing 5 which if admitted would soon deteriorate the latter. If all dust and other foreign matter is excluded from the bearing 5 said bearing alleviates the friction of the ring 7 and permits the latter to revolve at any speed with a minimum of resistance.

In order to attach the axle of the trolley wheel to the upper end of a trolley pole 13 two curved radially extending arms 14 are projected from the periphery of the flanges 12 which are formed integral therewith. The arms 14 embrace the ring 7 and the free ends thereof are disposed contiguously as shown in Fig. 2. Said free ends are designed for the reception of the trolley pole 13 and are so formed as to snugly fit thereon. In order to frictionally hold the contacting surfaces of the arms 14 to the trolley pole 13 the exterior surfaces of the ends of said arms are provided with tapered threads 15 on which a locking ring 16 having internal tapered threads is screwed as illustrated in Fig. 2. After the locking ring 16 has been tightly screwed upon the threads 15 a locking set-screw 17 is inserted therein so as to engage the threads 15 as shown in Fig. 2. In this manner the interior surfaces of the ends of the arms 14 are securely gripped upon the exterior surface of the end of the trolley pole 13, thus forming a rigid and reliable construction.

The construction is such that in the event of the ring 7 becoming worn or otherwise disabled through use, that the same may be readily and easily removed and a new one mounted in its place. The operation for removing an old ring 7 and replacing a new one simply consists in removing and replacing the bolt 2 which secures the two parts of the axle together and also locking the ring 16.

A trolley wheel of the construction as set forth may be economically manufactured due to the minimum number of parts and general simplicity of its design.

This trolley wheel is symmetrical in form and presents an artistic appearance which together with its mechanical features renders the same peculiarly adapted for the purpose for which it is designed.

While I have illustrated and described the preferred form of construction for carrying my invention into effect, this is capable of variation and modification without departing from the spirit of the invention. I therefore do not wish to be limited to the precise details of construction as set forth, but desire to avail myself of such variations and modifications as come within the scope of the appended claims.

Having described my invention what I claim as new and desire to secure by Letters Patent is:

1. A trolley wheel comprising a ring having a cylindrical internal surface and a grooved peripheral surface, a two-part axle having a cylindrical peripheral surface, the parts of said axle being jointed together transversely of the axis thereof, an axial bolt connecting the two parts of said axle together, there being a central chamber adapted to contain a supply of lubricant in said axle, a filling plug inserted in the wall of said axle whereby said lubricant is introduced into said chamber, a series of rollers interposed between said ring and axle, and a plurality of radial apertures establishing communication between said rollers and said chamber, whereby the lubricant contained in the latter is fed to said rollers, substantially as described.

2. A trolley wheel comprising a ring having a grooved periphery and a cylindrical interior surface, a laterally extending flange provided on each side of said ring, the interior surface of each flange constituting a part of the cylindrical interior surface of the ring, a two-part hollow axle divided transversely of the axis thereof, an axial bolt securing the parts of said axle together, the periphery of said axle being of a less diameter than the interior surface of said ring, a series of anti-friction rollers interposed between the interior surface of said ring and said axle, a radially extending flange provided on each part of said axle and inclosing the ends of said rollers, an inwardly extending flange provided at the periphery of each of said radial flanges and engaging over the laterally extending flanges of said ring, and means for lubricating the contacting surfaces of said rollers, substantially as described.

3. In a trolley wheel, a metallic ring having a peripheral groove for traversing the electrical feed wire, there being a cylindrical interior surface in said ring and laterally extending flanges arranged adjacent said interior surface, a two-part axle having a step joint intermediate the ends thereof and disposed transversely of the axis of the axle, means for securing the parts of said axle together, there being a chamber formed in the center of said axle, a filler plug arranged in the wall of said axle whereby a lubricant is introduced and retained in said chamber, a plurality of radially extending apertures connecting the exterior surface of said axle with said chamber, a roller bearing interposed between the interior surface of said ring and the exterior surface of said axle, said lubricant oozing through said apertures being adapted to lubricate said bearing, a radially extending flange provided in each part of said axle and inclosing said bearing, inwardly extending flanges provided at the periphery of said radially extending flanges and engaging over the laterally extending flanges of said ring, an arm formed integral with each part of said axle and extending radially therefrom, the free ends of said arms being contiguous, and means for securing the free ends of said arms to a trolley pole, substantially as described.

4. In a trolley wheel, a metallic ring having a peripheral groove for traversing the electrical feed wire, there being a cylindrical interior surface in said ring and laterally extending flanges arranged adjacent said interior surface, a two-part axle having a step joint intermediate the ends thereof and disposed transversely of the axis of the axle, means for securing the parts of said axle together, there being a chamber formed in the center of said axle, a filler plug arranged in the wall of said axle whereby a lubricant is introduced and retained in said chamber, a plurality of radially extending apertures connecting the exterior surface of said axle with said chamber, a roller bearing interposed between the interior surface of said ring and the exterior surface of said axle, said lubricant oozing through said apertures being adapted to lubricate said bearing, a radially extending flange provided on each part of said axle and inclosing said bearing, inwardly extending flanges provided at the periphery of said radially extending flanges and engaging over the laterally extending flanges of said ring, an arm formed integral with each part of said axle and extending radially therefrom, the free ends of said arms being exteriorly threaded and formed to embrace the upper end of a trolley pole, and an internally threaded locking ring screwed over the threaded ends of said arms for frictionally holding the latter to said trolley pole, substantially as described.

5. In a trolley wheel a metallic ring having a peripheral groove for traversing the electrical feed wire, there being a cylindrical interior surface in said ring and laterally extending flanges arranged adjacent said interior surface, a two-part axle having a step joint intermediate the ends thereof and disposed transversely of the axis of the axle, means for securing the parts of said axle together, there being a chamber formed in the center of said axle, a filler plug arranged in the wall of said axle whereby a lubricant is introduced and retained in said chamber, a plurality of radially extending apertures connecting the exterior surface of said axle with said chamber, a roller bearing interposed between the interior surface of said ring and the exterior surface of said axle, said lubricant oozing through said apertures being adapted to lubricate said bearing, a radially extending flange provided on each part of said axle and inclosing said bearing, inwardly extending flanges provided at the periphery of said radially extending flanges and engaging over the laterally extending flanges of said ring, an arm formed integral with each part of said axle and extending radially therefrom, the free ends of said arms being exteriorly threaded and formed to embrace the upper end of a trolley pole, an internally threaded locking ring screwed over the threaded ends of said arms for frictionally holding the latter to said trolley pole, and means for locking said locking ring to said threaded ends, substantially as described.

6. A trolley wheel comprising a peripherally grooved metallic ring having a cylindrical interior surface and laterally extending flanges the inner surface of which forms a portion of said interior surface, a two-part axle jointed together midway of the ends thereof, the joint being stepped and disposed transversely of the axis of said axle, an axial bolt having a countersunk head and nut passing through the parts of said axle and adapted to hold the same together, there being a chamber thus formed in said axle for the reception of a lubricant, a filler plug adapted to be inserted in the wall of said axle for the introduction of a lubricant to the chamber thereof, the peripheral surface of said axle being of a diameter less than the interior surface of said ring, a roller bearing interposed between said interior surface of said ring and the periphery of said axle, a plurality of radially extending apertures establishing communication between the periphery of said axle and said lubricant chamber whereby the lubricant automatically oozes out to lubricate the contacting surfaces of said bearing, a radially extending flange provided on each part of said axle and inclosing the sides of said bearing, an inwardly extending flange provided at the periphery of each radially extending flange and engaging over one of the laterally extending flanges provided in said ring, a pair of curved arms formed integral with the radially extending flanges of said axle and extending radially therefrom, the free ends of said arms being contiguous and provided with tapered external threads, said free ends being formed to embrace the upper end of a trolley pole, a locking ring having tapered internal threads screwed over the threaded ends of said arms, and a set-screw for retaining said locking ring in position, substantially as described.

In testimony whereof I have signed my name to this specification in the presence of two subscribing witnesses.

HENRY PRACK.

Witnesses:
 HELEN F. LILLIS,
 JOSHUA R. H. POTTS.